Dec. 19, 1967  O. A. SAMPSON, JR  3,359,308
PREPARATION OF DICARBOXYLIC ACIDS BY NITRIC ACID OXIDATION
Filed May 17, 1963
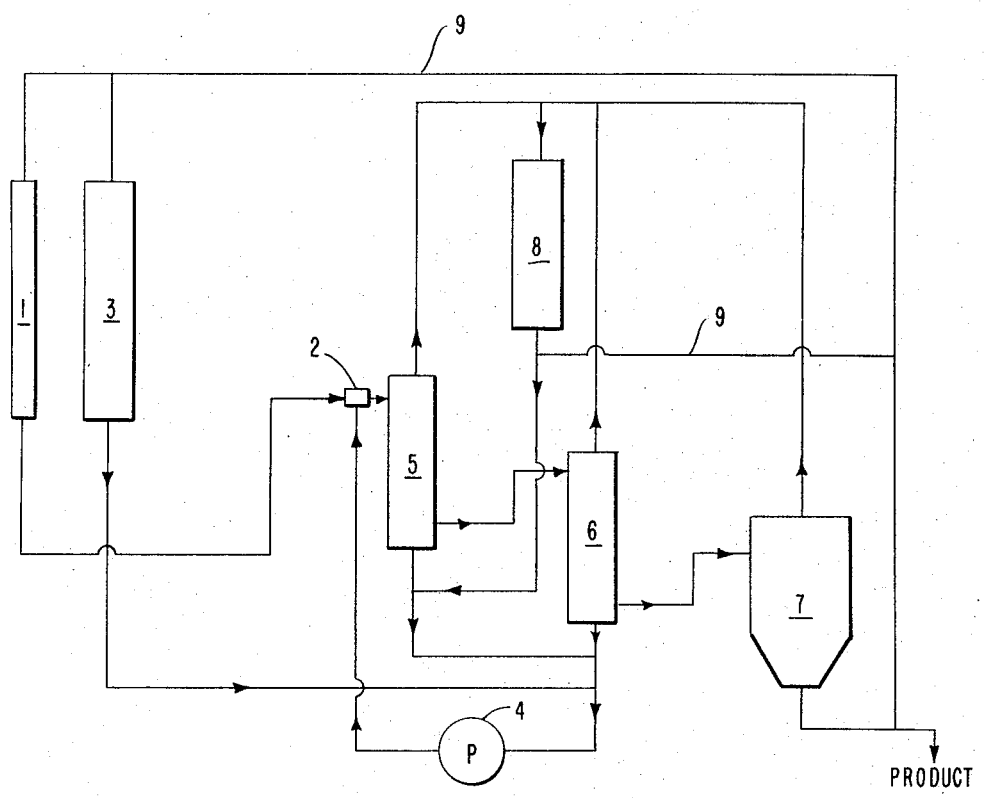
INVENTOR
OTIS A. SAMPSON, JR.
BY
ATTORNEY 3,359,308
PREPARATION OF DICARBOXYLIC ACIDS BY
NITRIC ACID OXIDATION
Otis Alwyn Sampson, Jr., Greenway Park, Tex., assignor to E. I. du Pont de Nemours and Company, Wilmington, Del., a corporation of Delaware
Filed May 17, 1963, Ser. No. 281,083
7 Claims. (Cl. 260—531)

This invention relates to a process for the preparation of alkane dicarboxylic acids. More specifically, it relates to a liquid phase nitric acid oxidation process for the production of alkane dicarboxylic acids from cycloalkanols and/or cycloalkanones.

The oxidation of cycloalkanes is a well-recognized process for the preparation of alkane dicarboxylic acids which are useful in the manufacture of synthetic resins, plasticizers, foodstuffs and industrial chemicals. The present state of the art includes many improvements which have been made since the first direct oxidation of cycloalkanes to alkane dicarboxylic acids. For example, because of the complexity of the reaction, it has been found desirable to conduct the oxidation in multiple stages so as to afford greater control over the products formed. U.S. Patent 2,223,494, issued Dec. 3, 1940, to D. J. Loder, discloses the preliminary oxidation of the cycloalkane to cycloalkanol and/or cycloalkanone, followed by a subsequent oxidation of the alcohol and/or ketone to alkane dicarboxylic acid. Further improvements in the preparation of dicarboxylic acids have been made, for example, by C. H. Hamblet et al. who disclose in U.S. Patent 2,439,513, issued Apr. 13, 1948, a two-stage oxidation of cycloalkanes employing an air oxidation for the formation of the cyclic alcohol and/or ketone and a nitric acid oxidation for the subsequent conversion to the dicarboxylic acid. The art, also, has recognized advantages which may be gained by employing oxidation catalysts and by precisely controlling the temperature in each stage of the oxidation. Still other improvements, such as described in U.S. Patent 2,557,282, issued June 19, 1951, to C. H. Hamblet et al., include splitting the aforementioned nitric acid oxidation step into two stages, namely, a preliminary oxidation of the alcohol and/or ketone at 40–90° C., and a subsequent oxidation at a higher temperature, such as above 90° C. but, generally, not in excess of 120° C.

In carrying out the aforesaid nitric acid oxidation of cycloalkanol and/or cycloalkanone, the nitrogen atom in the oxidizing agent undergoes a stepwise reduction in valence state depending upon the extent of its participation in the reaction. In commercial practice, the nitric acid generally is not considered to be "spent" or used up until it is converted to nitrous oxide and/or nitrogen. Since many of the nitric acid oxidation processes described in the art exhibit a peak in dicarboxylic acid yield with increasing nitric acid consumption, the chosen operating conditions frequently may reflect an economic balance between dicarboxylic acid production and nitric acid consumption.

It is an object of the present invention to convert cycloalkanols and/or cycloalkanones to alkane dicarboxylic acids by a liquid phase, nitric acid oxidation process which consumes appreciably lower quantities of nitric acid than processes heretofore known in the art. A further object is to provide this reduction in nitric acid consumption while maintaining the yield of alkane dicarboxylic acid essentially constant. A still further object is to form alkane dicarboxylic acids having the same number of carbon atoms as the cycloalkanols and/or cycloalkanones from which they are derived. Other objects will become apparent hereafter.

The objects of the present invention are achieved by means of a liquid-phase, catalyzed, nitric acid oxidation process wherein the oxidant is removed from the reactor before it is completely "spent," i.e., before it is converted completely to nitrous oxide and/or nitrogen. More particularly, the objects of the invention are achieved by conducting the aforesaid nitric acid oxidation process at a temperature of 90–140° C., in the presence of a copper-vanadium catalyst, wherein said process at least a part of the reaction mixture is recycled and mixed with fresh cycloalkanol and/or cycloalkanone feed in such a manner that the product of the weight ratio of recycle stream to cycloalkanol and/or cycloalkanone feed multiplied by the weight percent vanadium in the recycle stream is maintained within the range 30–60, and preferably 40–50. Whereas it generally would be expected that the intermediate nitric acid reduction products should not be removed from the reactor until their full oxidizing power has been exploited, it has been discovered as one aspect of the present invention that the total nitric acid consumption can be reduced appreciably by removing and recycling these intermediate reduction products before they are completely "spent" by conversion to nitrous oxide and/or nitrogen. Stated in another way, the intermediate reduction products must be contacted with fresh cycloalkanol and/or cycloalkanone while the average oxygen to nitrogen ratio in such reduction products still is greater than 0.5.

According to the procedure employed herein the cycloalkane-free cycloalkanol and/or cycloalkanone is oxidized at 90–140° C., preferably at 110–120° C., with 40–75 weight percent, preferably 40–55 weight percent, aqueous nitric acid. While the upper limits on both temperature and nitric acid concentration are not unduly critical with regards to the oxidation reaction, operation above the preferred temperature range may induce excessive equipment corrosion problems. Furthermore, use of nitric acid concentrations above the preferred range usually is effected at the expense of some of the advantages provided by the invention because of the higher production cost of the more concentrated nitric acids. The weight ratio of the aqueous nitric acid feed to cycloalkanol and/or cycloalkanone feed lies in the range 5–40 to 1 and preferably 5–15 to 1. Suitable oxidation catalysts are incorporated into the aqueous nitric acid feed. Especially preferred herein as a catalyst is a copper-vanadium mixture comprised of 0.30–0.60 weight percent oxidized copper and 0.01–0.50 weight percent oxidized vanadium, based on the total weight of catalyst and recycle solution. In the present invention the recycle material is analyzed and make-up catalyst and fresh nitric acid are added as needed to maintain the aforesaid ranges of catalyst and nitric acid concentrations. In addition, control is maintained over both the weight ratio of recycle solution to fresh cycloalkanol and/or cycloalkanone feed and the concentration of vanadium in said recycle solution so that the product of the weight ratio of recycle stream to cycloalkanol and/or cycloalkanone feed multiplied by the weight percent concentration of vanadium in the recycle stream, is maintained within the aforesaid range of 30–60, and preferably 40–50. While the concentration of catalysts used herein is defined in terms of the weight percentages of oxidized copper and oxidized vanadium, these elements, and especially the vanadium, may be added in a variety of forms. For example, the vanadium may be added as vanadium metal or as a vanadium compound such as the nitrate or hydroxide or as an oxyvanadium compound such as vanadate, with the amount of the compound added, however, being adjusted to provide the aforesaid vanadium content. Since it is believed that pentavalent vanadium is necessary to provide an active catalyst, it is preferable to add a material in which the vanadium already is in that valence state. Especially preferred herein as the vanadium component of the catalyst is sodium, potassium or ammonium vanadate. Since the use of excessive quantities of vanadium may lead to equipment corrosion problems and, also, in order to achieve the optimum benefit of the invention, the concentration of vanadium preferably employed is in the range 0.04–0.15 weight percent, based upon the total weight of recycle stream including catalyst. The copper generally is added as the metal. The ratio of the recycle stream to cycloalkanol and/or cycloalkanone feed may be varied over a wide range depending upon the vanadium concentration selected. The maximum vanadium concentration, which usually is limited by the necessity for avoiding equipment corrosion, determines the minimum in quantity of recycle and to a lesser extent the cycloalkanol and/or cycloalkanone feed rate. The maximum in quantity of recycle, on the other hand, is controlled by both the minimum in vanadium concentration and the feasibility of handling large volumes of recycle, and again to a lesser extent, the alcohol and/or ketone feed rate. It has been found that the weight ratio of recycle stream to cycloalkanol and/or cycloalkanone feed generally should be within the range 200–1300, and preferably in the range 250–550. The oxidation reaction described herein may be carried out over a wide range of pressures from subatmospheric to superatmospheric. It has been observed that nitric acid consumption may be reduced somewhat by decreasing the pressure when operating at or near atmospheric pressure. Usually, because of economic considerations, the process is operated under slightly positive pressures, for example up to about 200 p.s.i.g. Holdup times in the reactor will, of course, vary with the temperature employed. The maximum in holdup is not critical except from an economic standpoint since the product dicarboxylic acid remains unchanged after it is formed. Minimum holdup time may be as low as about 18 seconds at a temperature of 140° C. while maximum holdup seldom exceeds about 30 minutes. As representative of the holdup times utilized herein are the following: 0.3–11 minutes at 90–140° C. and 1.3–2.7 minutes at 110–120° C. The instant process is amenable to either batch type or continuous operation. The cycloalkanol and/or cycloalkanone used herein may be prepared by any of the methods adequately described in the art. As indicated hereinabove, either alcohol or ketone or mixtures of the two may be employed in the present invention. While large quantities of impurities are to be avoided, the process is operable despite the presence of the normal cycloalkanol and/or cycloalkanone impurities. Considerable amounts of water, for example 10–15%, may be present with the material to be oxidized although excessive quantities may impede maintenance of control of process stream concentrations because of the dilution effect of the water. The process, in general, is applicable to the preparation of alkane dicarboxylic acids having the same number of carbon atoms as the parent cycloalkanol and/or cycloalkanone. Because of its commercial significance the process is particularly useful in the preparation of the 4–6 carbon atom dicarboxylic acids, and especially adipic acid. After the oxidation as described above is complete, the product may be recovered and purified by means conventional in the art.

The accompanying flow diagram shows a typical setup in which the process of the invention may be conducted. Cycloalkanol and/or cycloalkanone is fed from a reservoir 1 to a mixing T2. Aqueous nitric acid with catalyst flows from a reservoir 3 through a recycle pump 4 to the mixing T2. The alcohol and/or ketone acid mixture enters a first reactor 5 in which a part of the raw material is converted to dibasic acid. A portion of the reaction mixture passes into a second reactor 6 in which additional raw material is converted to dibasic acid. After the startup operation is complete, at least a portion of the reaction mixture is withdrawn from the bottom of either or both reactors and recycled into the mixing T2, adding fresh nitric acid and catalyst if necessary, so that the product of the weight ratio of recycle stream to alcohol and/or ketone feed multiplied by the vanadium concentration is within the range prescribed hereinabove. As necessary to maintain constant volume in the system, overflow from the second reactor passes into a holdup tank 7 from which reaction mixture is removed and worked up to yield product dibasic acid. Volatiles from either of the reactors or from the holdup tank are liquefied in a condenser 8 and returned to the system. Moreover, common lines 9 may be connected to appropriate units in the system to equalize pressure. The invention may be effected with a single reactor, or a series of reactors may be utilized to lend flexibility to the recycle system. Furthermore, the recycle stream may be comprised of reaction mixture from any one or more reactors when a plurality of reactors is employed. The input cycloalkanol and/or cycloalkanone, instead of being introduced directly into the mixing T2 prior to entry into the first reactor, may be mixed with the recycle stream immediately after the latter's exit from the reactor. Suitable mixing devices, for example a draft-tube mixer, may be employed to facilitate blending of the streams.

The following examples are given to exemplify but not limit the invention as hereinabove defined:

*Example I*

A batch-type, temperature-controlled, glass reactor is adapted to permit introduction of separate streams of 50% aqueous nitric acid and a 1:1 mixture, by weight, of cyclohexanol-cyclohexanone and, also, to allow recycling of at least a part of the reaction mixture so that it contacts fresh alcohol-ketone prior to the entrance of the latter into the reactor. The feed streams are adjusted to maintain a 10–15 to 1 weight ratio of acid to alcohol-ketone. Sufficient copper and ammonium vanadate are added either to the nitric acid or to the recycle stream to maintain a level of 0.5 weight percent copper and 0.1–0.5 weight percent ammonium vanadate (0.04–0.22% calculated as vanadium) in the recycle stream. A series of experiments are conducted to determine the effect of recycle rate and vanadium concentration on the nitric acid consumption. Standard techniques are employed to analyze for nitric acid and the various oxides of nitrogen while the adipic acid yield is determined after customary workup of the reaction mixture employing crystallizing techniques. The oxidation reactions are conducted at 15–20 p.s.i.g. at 75–110° C. for 3–5 minutes, then at 115° C. for 10 minutes. Following is a tabulation of results showing the effectiveness of the present invention in reducing nitric acid consumption without substantially decreasing the yield of adipic acid.

NITRIC ACID OXIDATION OF CYCLOHEXANOL—CYCLOHEXANONE

| Expt. | Pressure (p.s.i.g.) | Temperature (° C.) 1st 3-5 mins. | Recycle/Alcohol-Ketone Feed | Wt. Percent NH₄VO₃ Concn. | Recycle/Alcohol-Ketone Feed × Vanadium Concn. | Lb. Adipic Acid/ lb. HNO₃ Consumed | Lb. Adipic Acid/ lb. Alcohol-Ketone consumed |
|---|---|---|---|---|---|---|---|
| A | 20 | 75 | 200 | 0.1 | 8.7 | 1.24 | 1.35 |
| B | 20 | 85 | 200 | 0.1 | 8.7 | 1.24 | 1.33 |
| C | 20 | 95 | 200 | 0.1 | 8.7 | 1.29 | 1.31 |
| D | 20 | 110 | 200 | 0.1 | 8.7 | 1.51 | 1.23 |
| E | 20 | 110 | 1,000 | 0.1 | 43.6 | 1.51 | 1.35 |
| F | 20 | 110 | 200 | 0.5 | 43.6 | 1.33 | 1.35 |
| G | 20 | 110 | 400 | 0.25 | 43.6 | 1.47 | 1.35 |
| H | 15 | 85 | 200 | 0.1 | 8.7 | 1.30 | 1.34 |
| I | 15 | 95 | 200 | 0.1 | 8.7 | 1.41 | 1.33 |
| J | 15 | 110 | 200 | 0.1 | 8.7 | 1.61 | 1.27 |
| K | 15 | 110 | 1,000 | 0.1 | 43.6 | 1.61 | 1.35 |

*Example II*

Employing a stainless steel, continuous-type setup similar to that shown in the drawing, a 1:1 mixture, by weight, of cyclohexanol-cyclohexanone, the mixture containing 4 weight percent water, is oxidized with 50% aqueous nitric acid. Sufficient copper and ammonium vanadate are added either to the nitric acid or to the recycle stream to maintain a level of 0.5 weight percent copper and 0.1–0.25 weight percent ammonium vanadate (0.04–0.11% calculated as vanadium) in the recycle stream. The ratio of acid to alcohol-ketone feed is 10–15 to 1. The process is conducted so as to achieve an overall holdup time in the system of 30 minutes. The following table summarizes the results achieved.

NITRIC ACID OXIDATION OF CYCLOHEXANOL-CYCLOHEXANONE

| Expt. | Pressure (p.s.i.g.) | Temperature (° C.) 1st Reactor | Temperature (° C.) 2nd Reactor | Recycle/Alcohol-Ketone Feed | Wt. percent NH₄VO₃ Concn. | Recycle/Alcohol-Ketone Feed × Vanadium Concn. | Lb. Adipic Acid/lb. HNO₃ Consumed | Lb. Adipic Acid/lb. Alcohol-Ketone Consumed |
|---|---|---|---|---|---|---|---|---|
| A | 15 | 75 | 110 | 200 | 0.1 | 8.7 | 1.19 | 1.34 |
| B | 35 | 75 | 110 | 200 | 0.1 | 8.7 | 1.15 | 1.34 |
| C | 35 | 110 | 110 | 400 | 0.25 | 43.6 | 1.28 | 1.32 |
| D | 35 | 110 | 110 | 1,000 | 0.1 | 43.6 | 1.37 | 1.36 |

*Example III*

Example II is repeated using cyclohexanol in place of the cyclohexanol-cyclohexanone mixture. Comparable results are achieved.

*Example IV*

Example III is repeated using cyclohexanone instead of the cyclohexanol-cyclohexanone mixture. Results similar to those shown in Example II are obtained.

I claim:

1. In a process for the preparation of alkane dicarboxylic acids by the liquid phase nitric acid oxidation of a reactant selected from the group consisting of cycloalkanols and cycloalkanones, the improvement of decreasing the nitric acid consumption while maintaining the yield of alkane dicarboxylic acid essentially constant by means of the steps comprising contacting said reactant, at a temperature of 90–140° C. for at least 0.3 minute with 40–75 weight percent aqueous nitric acid in the presence of a copper-vanadium catalyst, recycling at least a part of the reaction mixture containing 0.30–0.60 weight percent oxidized copper, 0.01–0.5 weight percent oxidized vanadium and nitric acid reduction products having an average oxygen to nitrogen ratio of greater than 0.5, while maintaining the product of the weight ratio of recycle to reactant multiplied by said oxidized vanadium concentration at 30–60, and thereafter recovering said alkane dicarboxylic acid.

2. The process of claim 1 in which the temperature is in the range 110–120° C. and the weight percent aqueous nitric acid is in the range 40–55.

3. The process of claim 1 wherein said alkane dicarboxylic acid is adipic acid, said cycloalkanol is cyclohexanol, said cycloalkanone is cyclohexanone.

4. The process of claim 3 wherein the weight percent aqueous nitric acid is in the range 40–55 and the product of the weight ratio of recycle to reactant multiplied by said oxidized vanadium concentration is in the range 40–50.

5. In a process for the preparation of adipic acid by the liquid phase nitric acid oxidation of a reactant selected from the group consisting of cyclohexanol and cyclohexanone, the improvement of decreasing the nitric acid consumption while maintaining the yield of adipic acid essentially constant by means of the steps comprising contacting said reactant, at a temperature of 90–140° C. for at least 0.3 minute with 40–75 weight percent aqueous nitric acid in the presence of a copper-vanadium catalyst, recycling at least a part of the reaction mixture containing 0.30–0.60 weight percent oxidized copper, 0.01–0.50 weight percent oxidized vanadium and nitric acid reduction products having an average oxygen to nitrogen ratio of greater than 0.5, while maintaining the product of the weight ratio of recycle to reactant multiplied by said oxidized vanadium concentration at 30–60 and the weight ratio of recycle to reactant at 200–1300, and thereafter recovering said adipic acid.

6. The process of claim 5 wherein the weight ratio of recycle to reactant is in the range 250–550.

7. The process of claim 6 wherein the weight percent aqueous nitric acid is in the range 40–55 and wherein the weight ratio of recycle to reactant multiplied by said oxidized vanadium concentration is in the range 40–50.

References Cited

UNITED STATES PATENTS

| 2,191,786 | 2/1940 | Aronow | 260—531 |
| 2,439,513 | 4/1948 | Hamblet et al. | 260—537 |
| 2,557,282 | 6/1951 | Hamblet et al. | 260—531 |
| 2,844,626 | 7/1958 | Kamlet | 260—531 |
| 3,242,206 | 3/1966 | Volkenburgh et al. | 260—514 |

LORRAINE A. WEINBERGER, *Primary Examiner.*

I. R. PELLMAN, V. GARNER, *Assistant Examiners.*